United States Patent [19]

Harvey

[11] 4,122,920
[45] Oct. 31, 1978

[54] DISC BRAKES FOR VEHICLES

[75] Inventor: Geoffrey Harvey, Birmingham, England

[73] Assignee: Girling Limited, Birmingham, England

[21] Appl. No.: 828,722

[22] Filed: Aug. 29, 1977

[30] Foreign Application Priority Data

Sep. 22, 1976 [GB] United Kingdom ............... 39372/76

[51] Int. Cl.$^2$ ......................................... F16D 55/224
[52] U.S. Cl. .................................................. 188/73.4
[58] Field of Search ................... 188/72.4, 72.5, 73.3, 188/73.4

[56] References Cited

U.S. PATENT DOCUMENTS 3,392,809 7/1968 Hodkinson et al. ............ 188/73.3 X

FOREIGN PATENT DOCUMENTS 1,375,697 11/1974 United Kingdom ................... 188/73.4

*Primary Examiner*—Duane A. Reger
*Attorney, Agent, or Firm*—Scrivener, Parker, Scrivener & Clarke

[57] ABSTRACT

In a disc brake including pad assemblies for engagement with opposite faces of a rotatable disc and a clamp assembly extending over the peripheral edge of the disc, the clamp assembly comprises pressure plates interconnected by spaced parallel limbs passing through superimposed openings in the plates and interconnected at one pair of adjacent ends by a bridge piece which acts on one of the pressure plates.

7 Claims, 3 Drawing Figures

DISC BRAKES FOR VEHICLES

SPECIFIC DESCRIPTION

This invention relates to improvements in disc brakes for vehicles of the kind in which first and second friction pad assemblies for engagement with opposite faces of a rotatable disc are guided for movement towards and away from the disc on abutments in a stationary drag-taking member which straddles the peripheral edge of the disc and which takes the drag of the pad assemblies when the brake is applied, and the first friction pad assembly is applied directly to one face of the disc by actuating means, the second friction pad assemblies being applied indirectly to the opposite face of the disc by the reaction of the actuating means which is transmitted to it through a clamp assembly which extends over the peripheral edge of the disc, the clamp assembly comprising a pair of pressure plates which are chordal to the disc and of which the outermost ends are interconnected by draw-bars which pass through superimposed openings in the pressure plates and the stationary member, the actuating means acting between the first friction pad assembly and the pressure plate which is adjacent thereto, and the second pressure plate acting on the second friction pad assembly.

In known disc brakes of the kind set forth the draw-bars comprise separate bolts which extend through the openings with the heads of the bolts engaging with the pressure plate, normally the second pressure plate, which is located on the outboard side of the disc when the brake is installed in a vehicle. The bolts are arranged in this way in order to restrict to a minimum the dimensions of the brake in an outboard direction. Even in spite of this the radial dimension of the heads provide the brake with a swept outline which may be difficult to accommodate within the relatively limited space available within the naves of some vehicle wheels.

According to my invention in a disc brake of the kind set forth the draw-bars comprise spaced parallel limbs of a bolt of U outline and the limbs are interconnected at one pair of adjacent ends by a bridge piece which acts on one of the pressure plates.

The limbs are integrally connected to the bridge piece by arcuate connector portions so that no parts of the bolt project in opposite circumferential directions beyond the outer surface of the limbs.

Thus when the brake is installed in a vehicle with the bridge piece outboard of the disc the swept outline of the brake is limited only by the spacing of the limbs and a relatively large disc may be used in the wheel in which the assembly is mounted.

Preferably the openings in the pressure plate through which the draw-bar project are open-ended and the circumferentially spaced outer ends of the pressure plate do not project beyond the outermost surface of the limbs.

At least part of the bolt may be of circular cross-section. The diameter may be constant throughout the bolt, or alternatively the diameter of the bridge piece may be different from the diameter of the limbs.

In one construction the bridge piece is received within a groove in the outer face of the pressure plate chordal with respect to the disc.

One embodiment of our invention is illustrated in the accompanying drawings in which.

Figure 1:
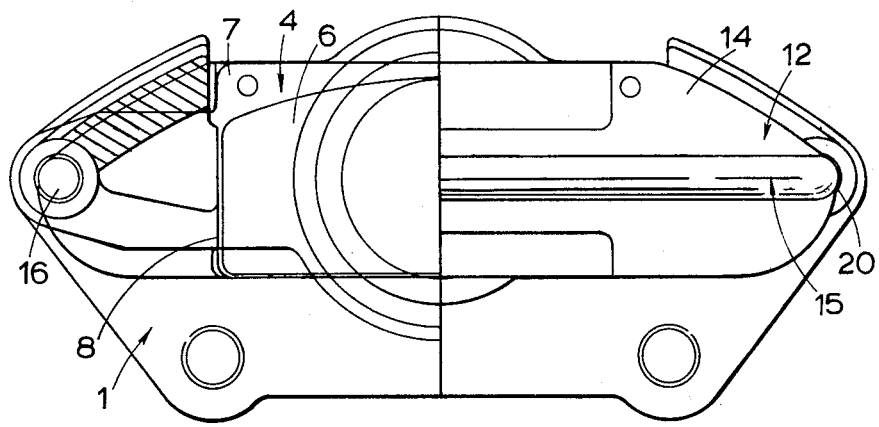
FIG. 1 is an end elevation of an hydraulically-operated disc brake for a vehicle including a half-section on the plane of the disc.
Figure 3:
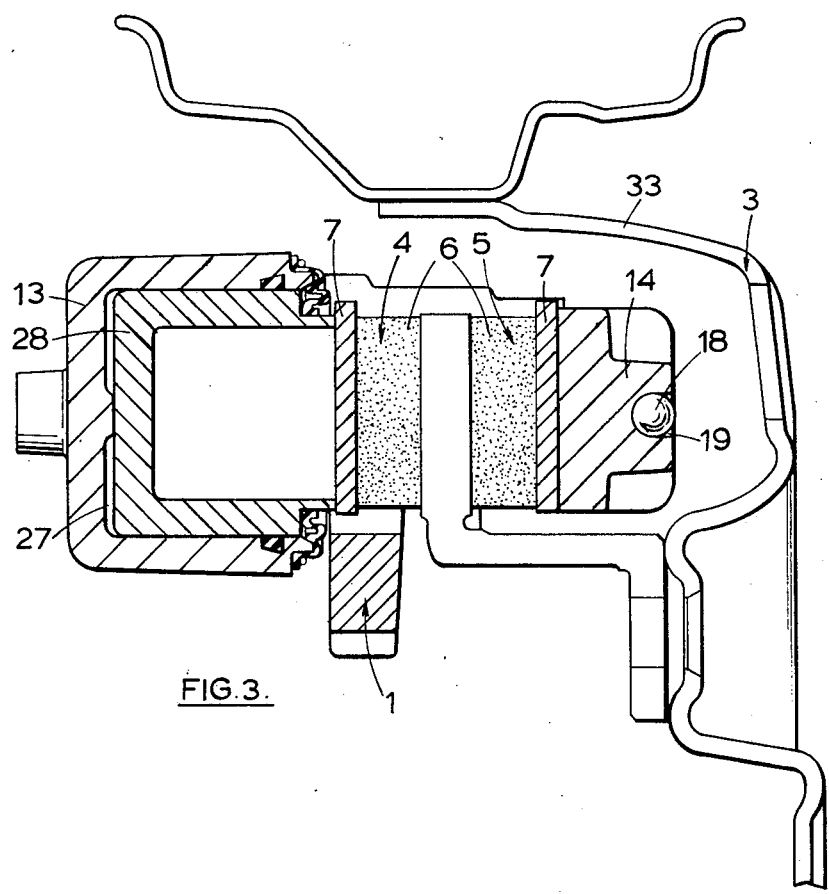
FIG. 3 is a longitudinal section through the brake.
Figure 2:
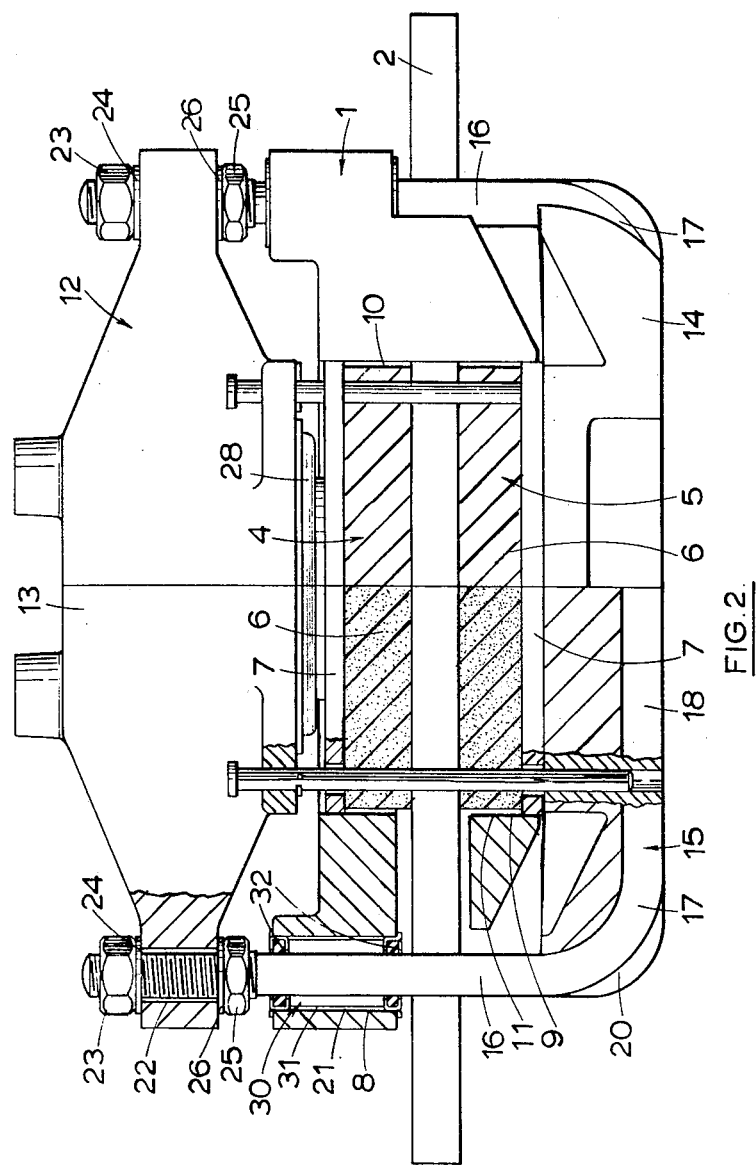
FIG. 2 is a plan view of the brake including a half section on a chord of the disc passing through the bolt.

In the hydraulically-operated brake illustrated in the drawings a stationary-drag taking member 1 of U-shaped outline straddles a portion of the periphery of a disc 2 rotatable with a wheel 3. Friction pad assemblies 4 and 5, each comprising a pad of friction material 6 carried by a rigid backing plate 7, are housed in radial gaps 8 and 9 in the stationary member 1 on opposite sides of the disc 2 and are guided in an axial direction for movement towards and away from the disc on spaced abutments surfaces 10 and 11 at opposite ends of the gaps 8, 9 which take the drag on the pad assemblies 4 and 5 when the brake is applied and with which the backing plates 7 engage slidably.

A clamp assembly 12 extends at the peripheral edge of the disc 2. The clamp assembly 12 comprises a pair of pressure plates 13 and 14 which are interconnected at the opposite ends by a bolt 15 of U outline and of constant circular section throughout its length. Specifically the bolt 15 comprises spaced parallel limbs 16 which are connected by arcuate connector portions 17 to an integral bridge piece 18. The bridge piece 18 is received in a recess 19 in the outer face of pressure plate 14, with the recess lying on in a chordal plane of the disc 2, and the limbs 16 project through open-ended openings 20 in the pressure plate 14, through bores 21 in the stationary member, and through openings 22 in the pressure plate 13. Portions terminating at the free ends of the limbs 16 are screw-threaded to receive nuts 23 and washers 24 which form abutments with the outer face of the pressure plate 13. Also additional nuts 25 and washers 26 may engage with the inner face of the pressure plate 13 to clamp the limbs 16 firmly to the pressure plate 13.

The bolt 15 is preferably made of high tensile steel to allow its diameter to be as small as possible, and the free ends are thread-rolled while the bolt is still straight, the U-shape subsequently being formed by heat-treating. The bending radius is made as large as the design permits and no smaller than the wire diameter allows.

The pressure plate 13 defines a housing for an hydraulic cylinder 27 in which works a piston 28 for applying the friction pad assembly 4 directly to the disc 2 and the reaction urges the pressure plate 13 and, in consequence, the clamp assembly 12 in the opposite direction to urge the other friction pad assembly 5 into engagement with the opposite face of the disc.

Since the drag on the friction pad assemblies 4 and 5 is taken by the stationary member 1 the limbs 16 of the bolt 15 are subjected to pure tension forces. However, to permit the clamp assembly 12 a limited movement in a circumferential direction with the pad assemblies 4 and 5 when the brake is applied the bore 21 is of a diameter greater than the limbs 16 to accommodate resilient bias means 30 for restraining the clamp assembly 12 to a neutral position. As illustrated the bias means comprise a sleeve 31 which is received in each bore 21 and adjacent to each end is provided with inwardly directed tags defining grooves to retain axially spaced deformable rings 32 which embrace each limb 16.

When the brake is mounted in a vehicle the pressure plate 14 is located on the outboard side of the disc 2. The ends of the pressure plate 14 are curved and where they join the ends of the openings 20 are flush with the limbs 16. Similarly the groove 19 is substantially equal in depth to the diameter of the bridge piece 18.

This reduces the swept outline of the brake to a minimum limited only by the spacing between the limbs 16, thereby facilitating installation within a space limited by the dimension of the nave 33 of the wheel.3. The construction also ensures that the outboard pressure plate is positioned "square" to the disc almost continuously, and thus reduces pedal travel.

Although the bolt is shown with a circular cross-section, other shapes are possible and the recess 19 may be V-shaped. The bridge piece 18 would then be gripped in the recess on the first heavy brake application. However care would have to be taken to ensure that the bolt and pressure plate remained thus assembled at all times, particularly following maintenance work.

I claim:

1. A disc brake for a vehicle comprising a rotatable disc, first and second friction pad assemblies for engagement with opposite faces of said disc, a stationary drag-taking member straddling the peripheral edge of said disc and having abutments on which said pad assemblies are guided for movement towards and away from said disc, a clamp assembly extending over the peripheral edge of said disc and slidably guided on said stationary member for movement in a direction substantially parallel to the axis of said disc, and actuating means for applying said first friction pad assembly directly to one side of said disc and applying said second friction pad assembly indirectly to said disc by a reaction transmitted to it through said clamp assembly, said clamp assembly comprising first and second pressure plates which are chordal to said disc and have superimposed openings at their outermost ends, said stationary member having openings superimposed with said openings in said pressure plates, and a bolt of U outline interconnecting said pressure plates comprising spaced parallel limbs which pass through said superimposed openings in said pressure plates and said stationary member, and a bridge piece interconnecting said limbs at one pair of adjacent ends and acting on one of said pressure plates, said actuating means acting between said first friction pad assembly and said first pressure plate which is adjacent thereto, and said second pressure plate acting on said second friction pad assembly.

2. A disc brake as claimed in claim 1, wherein said limbs have arcuate connector portions by which they are integrally connected to said bridge piece such that no parts of said bolt project in opposite circumferential directions beyond the outermost surface of said limbs.

3. A disc brake as claimed in claim 1, wherein said bridge piece acts on said second pressure plate which is located on the outboard side of said disc when said brake is installed in a vehicle.

4. A disc brake as claimed in 1, wherein said openings in said one pressure plate through which said limbs project are open-ended and the circumferentially spaced outer ends of said pressure plate do not project beyond the outermost surface of said limbs.

5. A disc brake as claimed in claim 1, wherein at least part of said bolt is of circular cross-section.

6. A disc brake as claimed in claim 1, wherein said pressure plate against which said bridge piece acts has a groove in its outer face chordal with respect to said disc in which said bridge piece is received.

7. A disc brake as claimed in claim 3, wherein screw threaded portions are provided at the free ends of said limbs and nuts having corresponding screw threaded portions are mounted on said free ends and form abutments with the outer face of said first pressure plate.

* * * * *